Oct. 18, 1966

J. BERNE ETAL 3,279,547

SUBMARINE CORING DEVICE

Filed Jan. 15, 1964

7 Sheets-Sheet 1

INVENTORS
JEAN BERNE
PIERRE MOULIN
ALBERT TRUYOL

BY Krafft & Wells

ATTORNEYS

INVENTORS
JEAN BERNE
PIERRE MOULIN
ALBERT TRUYOL
BY Krafft & Wells
ATTORNEYS.

INVENTORS
JEAN BERNE
PIERRE MOULIN
ALBERT TRUYOL

BY Krafft & Wells

ATTORNEYS.

INVENTORS
JEAN BERNE
PIERRE MOULIN
ALBERT TRUYOL

BY *Kraffe & Wells*
ATTORNEYS

Oct. 18, 1966 J. BERNE ETAL 3,279,547

SUBMARINE CORING DEVICE

Filed Jan. 15, 1964 7 Sheets-Sheet 5

INVENTORS
JEAN BERNE
PIERRE MOULIN
ALBERT TRUYOL

BY Krafft & Wells

ATTORNEYS.

Oct. 18, 1966 J. BERNE ETAL 3,279,547

SUBMARINE CORING DEVICE

Filed Jan. 15, 1964 7 Sheets-Sheet 6

INVENTORS
JEAN BERNE
PIERRE MOULIN
ALBERT TRUYOL

BY Krafft & Wells

ATTORNEYS.

INVENTORS
JEAN BERNE
PIERRE MOULIN
ALBERT TRUYOL

BY Krafft & Wells

ATTORNEYS

3,279,547
SUBMARINE CORING DEVICE

Jean Berne, Vernouillet, Pierre Moulin, Montesson, and Albert Truyol, La Celle-Saint-Cloud, France, assignors to Institut Francais du Pétrole, des Carburants & Lubrifiants, Rueil-Malmaison, France Filed Jan. 15, 1964, Ser. No. 337,850
Claims priority, application France, Jan. 17, 1963, 921,781
16 Claims. (Cl. 175—6)

This invention relates to a new submarine coring device which particularly allows the taking of cores from submerged formations beneath the upper layer thereof which consists of sediments, mud or soft materials.

The invention is more particularly suitable for taking cores from submerged formations by means of a core cutter head driven by an electric motor placed at the bottom.

Up to now, the submarine coring of hard formations is generally carried out from a platform or a barge, using a conventional drill string, the lower part of which contains a core barrel and is provided at its end with a core cutter head, into the central hole of which, there is formed the core which progressively moves upward thereinto as the coring proceeds.

Once the coring barrel is filled up, it is drawn back to the surface, for instance through the inside of the drill string.

Other coring methods are also used, for instance, for oceanography prospections, such as those consisting of driving a core barrel into the submerged formations by percussion, using the dropping force of a heavy body from a given height, or by hydrodynamic means, but these methods are only applicable for taking cores from soft soils.

Moreover, the coring method using a drill string has numerous disadvantages such as the lengthy operations required for connecting the various drill pipe elements to one another, the need of a derrick and, in case of deep coring, the need to use a barge or other ship which must be of a sufficiently large size in order to have the required stability for carrying out the coring operation.

Independently of this latter case where the use of a platform is impossible, many difficulties arise, due to the waves, the currents and/or the climatic disturbances which tend to move the ship away from its initial position, on the one hand, and to subject the same, on the other hand, to vertical displacements corresponding to the hollows and the crests of the waves.

Under such conditions, it is difficult to maintain the drill string in a substantially vertical position in line with the well, and the tolerable maximal deviation of the drill string with respect to the vertical is relatively low.

Also, the ship's movements make it difficult to adjust the load applied to the coring tool.

One way to overcome these difficulties consists of regulating the lowering or raising of the drill string supporting member with respect to the ship, whereby there is adjusted the tensile stresses to which the drill string is subjected so that the load on the coring tool will be maintained constant irrespective of the ship's displacements. However, according to the type of ship used and the conditions of the sea, the vertical movements of the ship may attain several meters. Accordingly, there is required in such cases the use of a servomechanism capable of adjusting with a high accuracy (within a few percent) the weight of a heavy load which may be for instance of the order of 20 to 30 metric tons. This however is a very complex mechanism, the use of which results in a considerable increase in the cost of the coring equipment. Moreover, this type of regulating means requires a very restrictive margin of movement for the ship. In the case of deep coring, the drill string must be kept permanently within a cone having its peak at the well boring head, and the ship must accordingly be so handled as to be permanently positioned inside the base of this cone. Also, the maximal tolerable value for the angle of roll cannot be very large.

It is an object of this invention to avoid these disadvantages by providing a submarine coring device which does not require the use of a conventional rigid drill string.

It is another object of this invention to provide a submarine coring device which does not require the use of a large ship of sufficient stability for supporting a derrick.

It is still another object of this invention to provide a submarine coring device which may be operated with enlarged margins for the displacements of the ship.

It is a further object of this invention to provide a submarine coring device whereby the load on the coring tool is maintained substantially constant during the coring operation, without the use of any servomechanism.

It is still a further object of this invention to provide a submarine coring apparatus adapted to take cores only in the hard formations under the sediment layers of the sea bed.

These and other objects as may be apparent from the following specification and claims are achieved by the device according to this invention, comprising essentially in combination a bottom motor (e.g. an electric motor) driving the coring tool with which is associated a core barrel wherein the core is housed, which core is formed as the coring proceeds, a water-tight pump feeding water under pressure to a flexible pipe from which is suspended the bottom motor and the associated elements, and a floating submerged element or buoy from which is suspended said pump to provide an upward force whereby the assembly formed by the coring tool, the core barrel, the flexible pipe and the pump are maintained in a substantially vertical alignment.

Said device is handled from the ship by means of a cable, which may optionally comprise electric conductors feeding current to the electric pump and to the bottom motor if an electric motor is used.

The invention will be further explained in more detail in the following description with reference to the accompanying drawings. It is understood, however, that said drawings and description are by way of illustration and example only and are not to be taken as a limitation of the scope of this invention.

In these drawings wherein like numerals indicate corresponding parts throughout:

Figure 1:
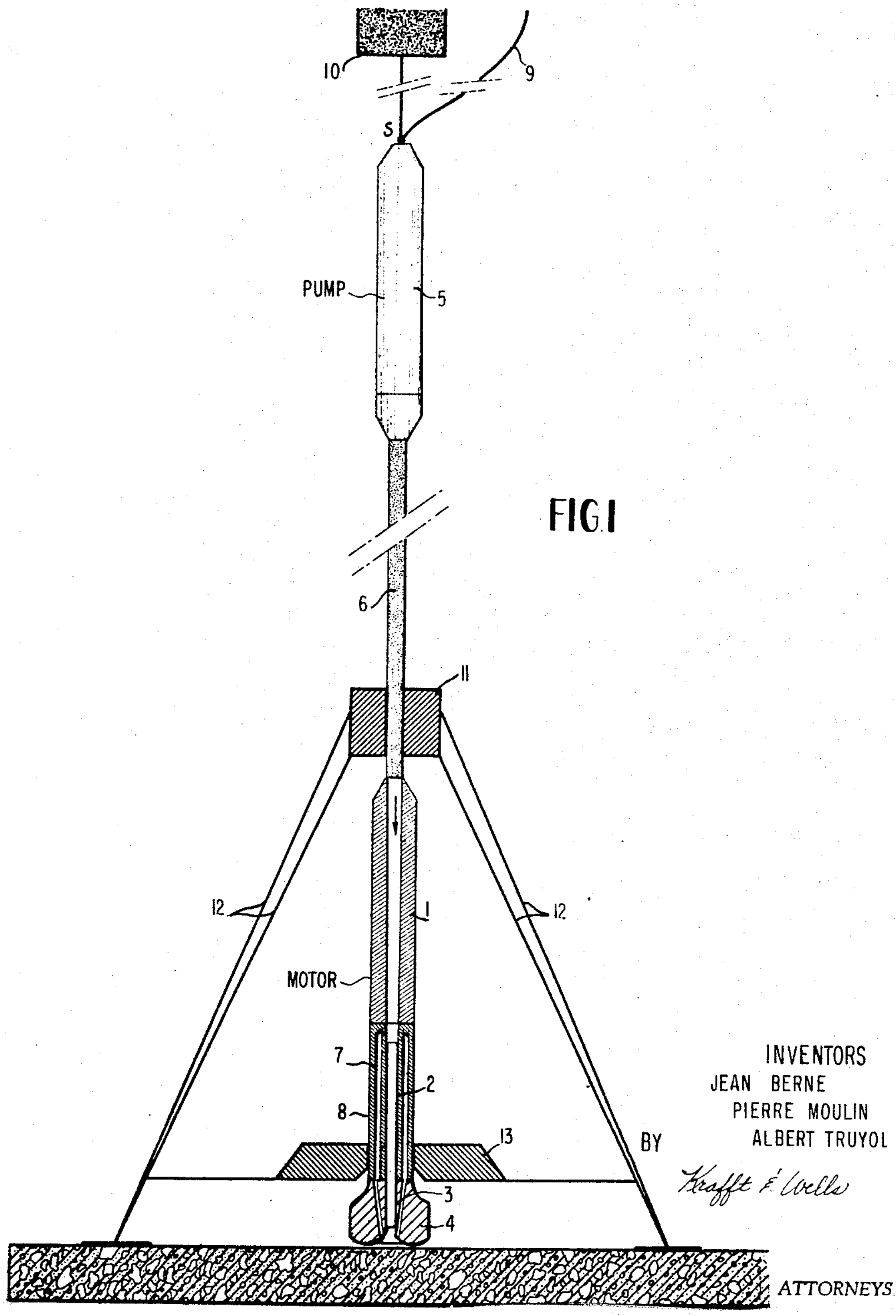
FIG. 1 is a schematic general view of the assembly of the different cooperating elements forming the device of the invention, said elements being shown in operative position.
Figure 2:
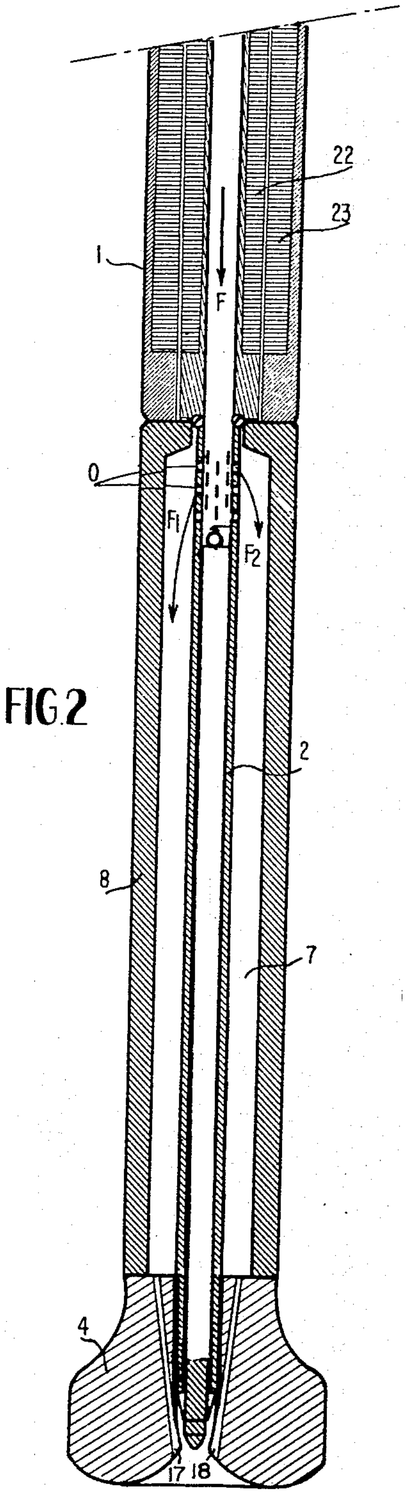
FIGURE 2 shows an electric boring motor associated with a core barrel positioned in alignment with the motor stator in a cylindrical space in a rotor extension integral with the rotor and having the core drill secured to the lower end thereof.

The submarine coring device of this invention is shown in FIGURES 1 and 2 and comprises essentially a submerged electric motor 1 having a central tubular stator providing a passage for the flushing fluid, associated with a core barrel 2, in alignment with the central hole 3 of a core cutter head 4 driven by the peripheral rotor of said electric motor, a water-tight pump 5 located above said motor and connected therewith through a reinforced flexible tube 6, the interior of which is provided with inner conductors for feeding the electric motor with electric current. The pump 5 feeds water under pressure, used as flushing fluid, to the core cutter head 4 through the tube 6, the inner hole of the central tubular stator of the motor 1 and the annnular space 7 between the core barrel 2 and the rotor extension 8, driving the core cutter head.

Figure 11:
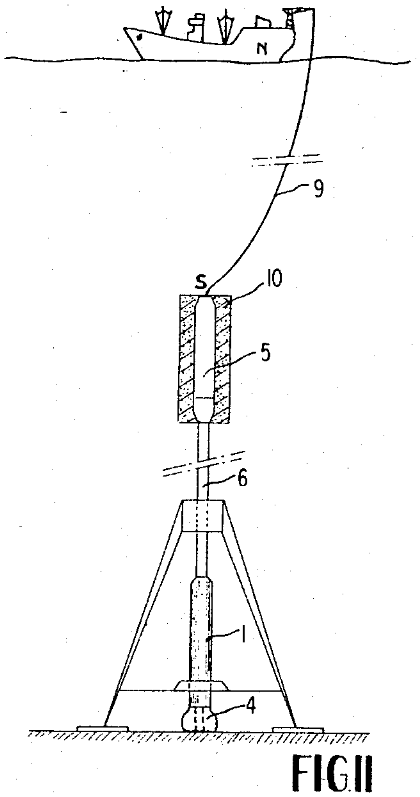
FIGURE 11 shows a modification in which the pump carried in a floating structure and where the apparatus is put into operation from a ship at the surface.

The assembly formed by the core cutter head, the core barrel, the bottom motor, the flexible tube and the pump, is lowered from the ship (N, FIG. 11) close to the sea bottom, by means of a cable 9 and is maintained in substantially vertical alignment by the upward force exterted by an immersed floating member or buoy 10 to which said assembly is suspended, the pump being optionally integral with said buoy (FIG. 11).

Besides, the vertical direction of the drilling is maintained by use of at least one guide member 11 for the flexible tube, supported at a certain height above the sea bottom by a base structure which may be, for instance, in the form of a tripod 12.

In the embodiment of the apparatus shown in FIG. 1 said tripod is also provided with a second guide member 13 for the bottom motor in the close vicinity to the sea bed.

Figure 3:
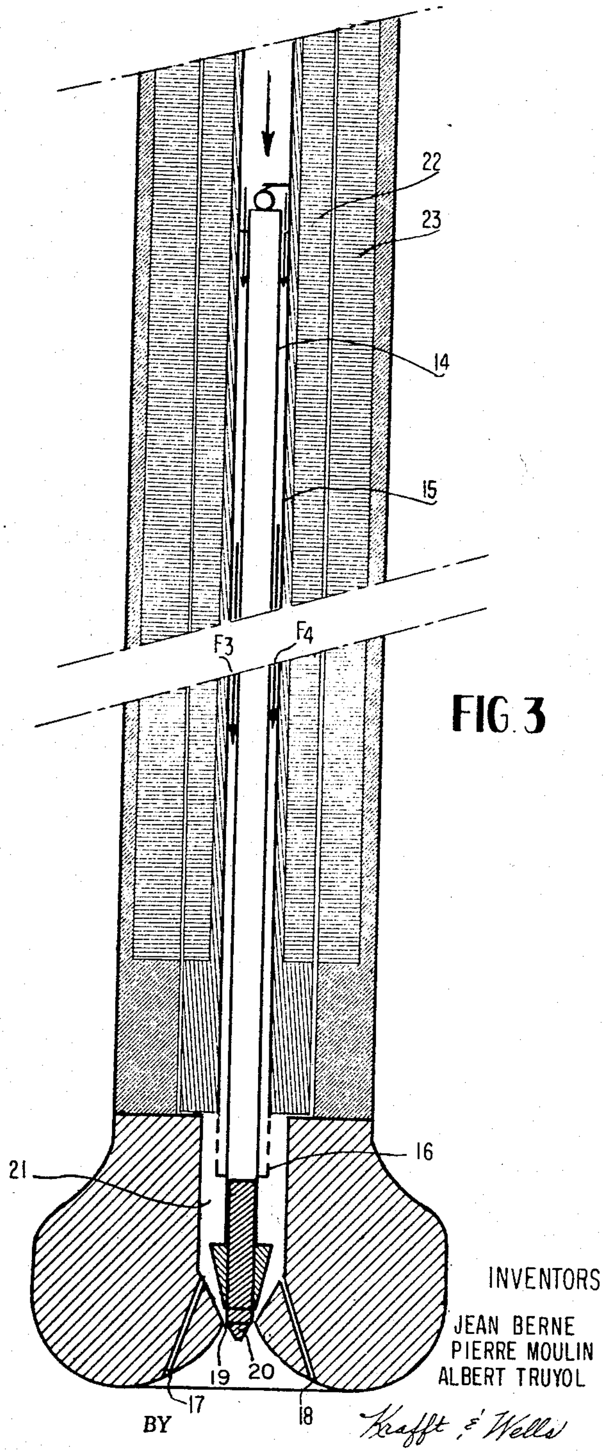
FIGURE 3 shows a modification in which electric boring motor has the core barrel positioned in the central stator inside the rotor.

The bottom motor, of conventional type, may consist of an electric motor having a central tubular stator and a peripheral rotor. In such a case, the core barrel may be placed co-axially within the tube formed inside the stator, as shown in FIG. 3. However, it is also possible, as shown in FIG. 2, to have a core barrel in alignment with the stator of the electric boring motor and integral therewith and a rotor extension 8 rotated by the rotor, and to the end of which the core drilling head is secured.

In this type of electric coring equipment, ports O are provided above the core barrel so as to permit the flushing fluid to flow within the annular space 7 formed between the core barrel and the core cutter head driving member 8.

Arrows F, F1 and F2 in FIG. 2 shows the circulation of the flushing fluid from the inner tube of the electric motor to the annular space 7 from where it is conveyed to the working face through channels 17 and 18.

In the embodiment illustrated in FIG. 3, the flushing fluid flows through the annular space formed between the core barrel 14 and the internal wall 15 of the stator 22, in the direction of arrows F3 and F4, and from there to the working face through ports of the annular centering member 16, through the inner space 21 of the core cutting head and channels 17 and 18 provided therefor within the core cutter head, as well as through the free space 19 formed between the section of smaller diameter of the cutter head and the co-axial locking element 20.

This locking element 20 is provided for avoiding the taking of the core into the upper sediment layer of the sea bed. It may consist of a mere piston, inside the core barrel (piston 20 in FIG. 4).

Figure 5:
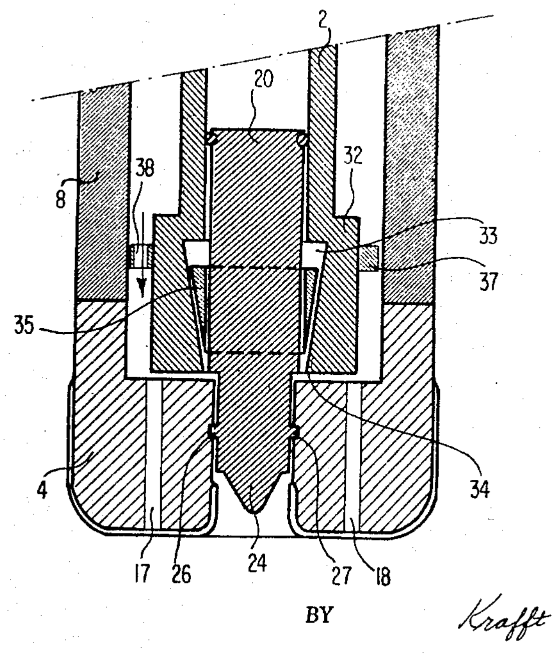

The lower face 25 of said piston will be preferably chosen of lower cross-sectional area than the piston itself so as to facilitate the penetration thereof into the sediment layer. For this purpose, it may also be convenient to give to the lower end of the piston a taper 24 as shown in FIG. 5. However, such a shape may have the disadvantage of breaking the core as it penetrates into the core barrel while pushing away the piston toward the top thereof.

Figures 4, 4A:
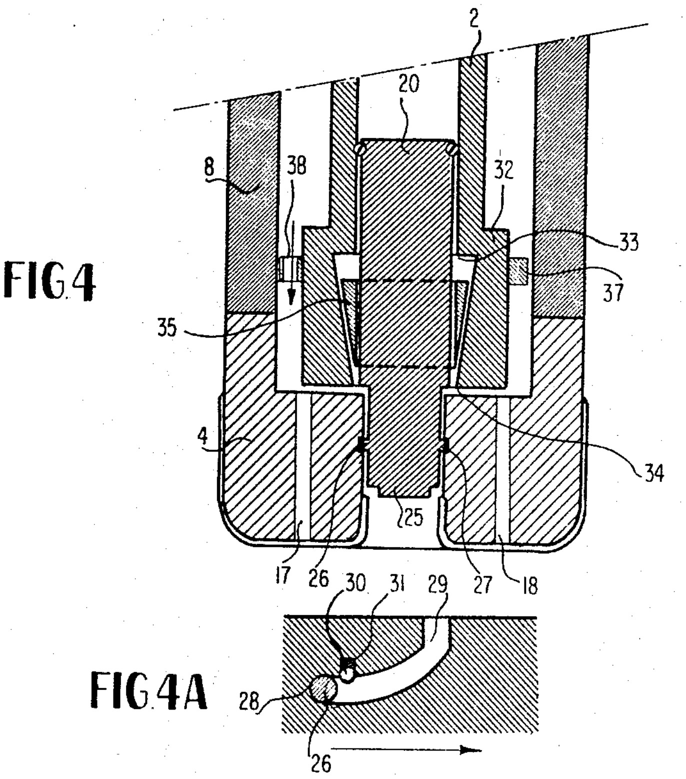
FIGURES 4, 4A, 5, 6, 6A, 7 and 8 represent various devices for taking cores from only the submerged hard formations beneath the upper soft sediment layer of the sea bed.

On the contrary, a flat end face of the piston, as shown in FIG. 4 does not suffer from this drawback, but its penetration through the sediment layer is more difficult. According to the nature of the sediment layer, there will be selected one of these two shapes or a shape intermediate there-between as a compromise between the larger penetration ability into the sediment layer and the less serious risks of breaking the core.

As shown in FIGURES 4 and 5, the end part 32 of the core barrel is so arranged as to form a core-catcher. For this purpose, the end part of the core barrel will have an external diameter larger than that of the remaining part thereof and will be provided with an inner cavity 33 frustro-conically shaped with its large base at the top and its lower base 34 of substantially the same inner diameter as that of the core barrel.

Between the inner wall of said cavity 33 and the piston 20 is housed the core catcher 35 consisting of an annular wedge whose height is lower than that of the cavity 33 and where it may slide freely.

This annular wedge locks the core into the core barrel when the latter is raised.

It must be observed that between the revolving member 8 driving the core cutter head, and the stationary core barrel 2 integral with the stator of the electric motor, there is arranged an annular centering ring 37 provided with ports 38 for the passage of the flushing fluid to channels 17 and 18 opening onto the working face.

The piston 20 may either act as a mere stopping plug by preventing penetration of a soft sediment core into the core barrel or clogging thereof by mud, or contribute to the penetration of the tool into the sediments, as it is the case of the piston in the embodiment shown in FIGURES 4 and 4A.

According to this embodiment, the lower part 25 of the piston comprises a blade and is provided with at least two pins 26 and 27 on its cylindrical surface, said pins being housed in corresponding cavities or grooves of the internal wall of the core cutter head, the cross section of which in a vertical plane is advantageously selected in conformity with that shown in FIG. 4A.

These pins, in combination with the corresponding grooves therefor form a locking mechanism of the bayonet type wherein, in one revolving direction the pin (26 in FIG. 4A) is stopped by the end wall of the cavity 29 so that the blade-carrying piston is driven together with the core cutting head 4 in the revolving direction shown by the arrow in FIG. 4A, whereas when the cutting head is revolved in the opposite direction the pins are disengaged from the cavity and the piston is no longer solid with the cutting head.

According, a simple change in the revolving direction of the coring tool (obtained by reversal of the running direction of the electric motor), after passage across the sediment layer, is sufficient to release from the cutter head the blade-carrying piston and to cause the same to be pushed upwardly by the core into the core barrel.

However, in order to avoid any accidental unlocking of the blade-carrying piston, which might result for instance from a sudden decrease in the running speed of the electric motor, it is convenient to provide the cavity 29 with an elastic stop 30 preventing any disengagement of the pin from the end part 28 of the cavity as long as the force applied by the pin on said elastic stop is substantially lower than that resulting from the reverse revolution of the coring tool in hard formations.

The elastic stop 30 may consist of a simple ball connected to a spring taking its bearing on the bottom of a cavity 31 provided therefor in the inner wall of the cutter head, as shown by way of example in FIG. 4A.

It is also possible to provide the same bayonet locking system wherein the pin is integral with the inner wall of the cutter head and a cavity is provided in the cylindrical surface of the piston for housing said pin. Such a system is illustrated by FIGURES 6 and 6A showing, by way of example, such a cavity 40 of helical shape.

Although it is not shown on the drawings, an elastic stop of the same type as stop 30 of FIG. 4A may be advantageously provided in the piston so as to cause the pin 42 or 43 to abut upon the end wall 39 of the cavity 40.

In such a case, the diameter of the core must not exceed the distance between the closer ends of the two pins 42 and 43 since otherwise the core will be stopped by these pins and will be consequently broken prior to penetrating into the core barrel.

Figure 6:
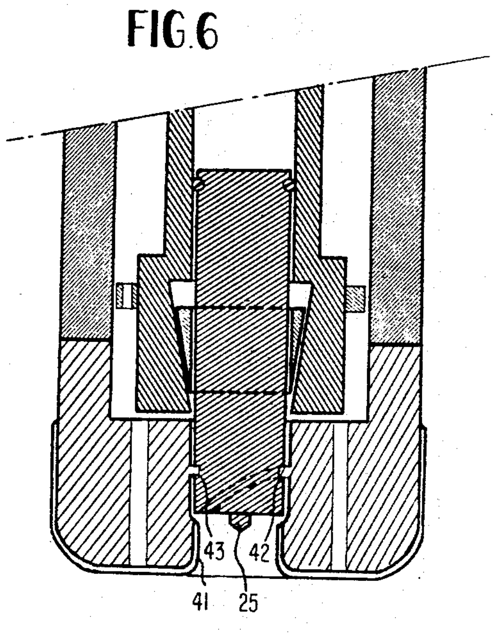
Figure 6A:
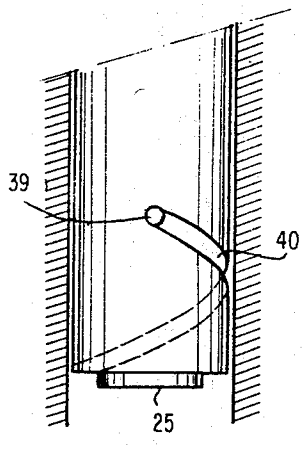

The inner diameter 41 of the cutter head is therefore made less than this distance, as shown for example in FIG. 6.

Figure 7:
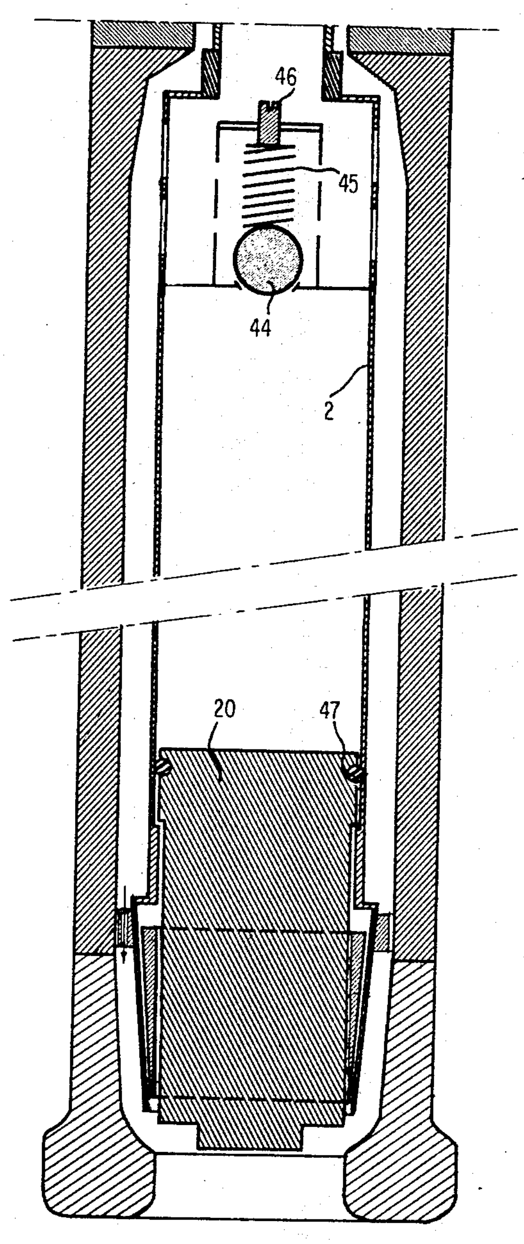

Another embodiment of the invention, wherein the piston merely acts as a stop plug, as illustrated in FIG. 7, also provides for core taking only in hard formations. According to this embodiment, the core barrel is provided at its upper part with a port, closed by a valve, which may consist of a ball 44, inasmuch as the pressure within the core barrel remains lower than the calibration pressure of the spring 45 which may be adjusted at will by means of the screw 46.

The core barrel is filled up with a liquid, water for instance, and the piston 20 is provided with a seal 47 so as to prevent any leakage of liquid. Due to the incompressibility of the latter, the piston will be displaced only when it exerts on the liquid a pressure higher than the calibration pressure of the spring 45. This calibration pressure will be so adjusted as to be higher than the pressure exerted on the piston during penetration thereof through the sediment layer but also lower than the pressure exerted on the piston by the harder layers, a core of which is to be taken.

Thus, when the piston will contact the hard formations, the core, as it is formed, will push the piston upward into the core barrel and expel the liquid contained therein.

Figure 8:
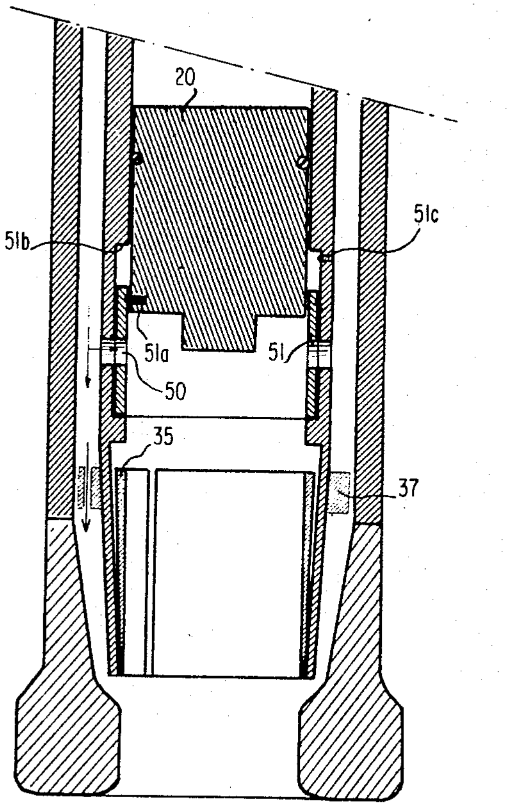

In order to facilitate the penetration of the coring tool into the upper layer of sediments, it may be advantageous to make use of a core barrel of the type shown in FIG. 8, comprising at its lower end, but above the annular wedge 35, ports 50 through which is maintained a circulation of flushing fluid below the piston 20 whereby the destruction by washing of any core of soft soils or sediments which might be formed, is facilitated.

Such circulating flow of flushing fluid is additional to the normal circulation passing through the ports of the annular ring 37 which is discharged beneath the annular wedge 35. These two flows of flushing fluid are shown by the arrows on FIGURE 8. At the moment when the harder layers are penetrated, the formed core penetrates into the core barrel and pushes the piston 20 upwardly. The piston transmits motion to the tubular socket 51 whose ports register with the ports 50, through the intermediary of a spring locking sysem 51*a* until the socket is stopped by the shoulder 51*b*. The socket is then kept in that position by means of another spring locking system 51*c* so as to close permanently the flushing fluid inlet ports 50 and thus avoid any partial destruction of the core by washing.

Figure 9:
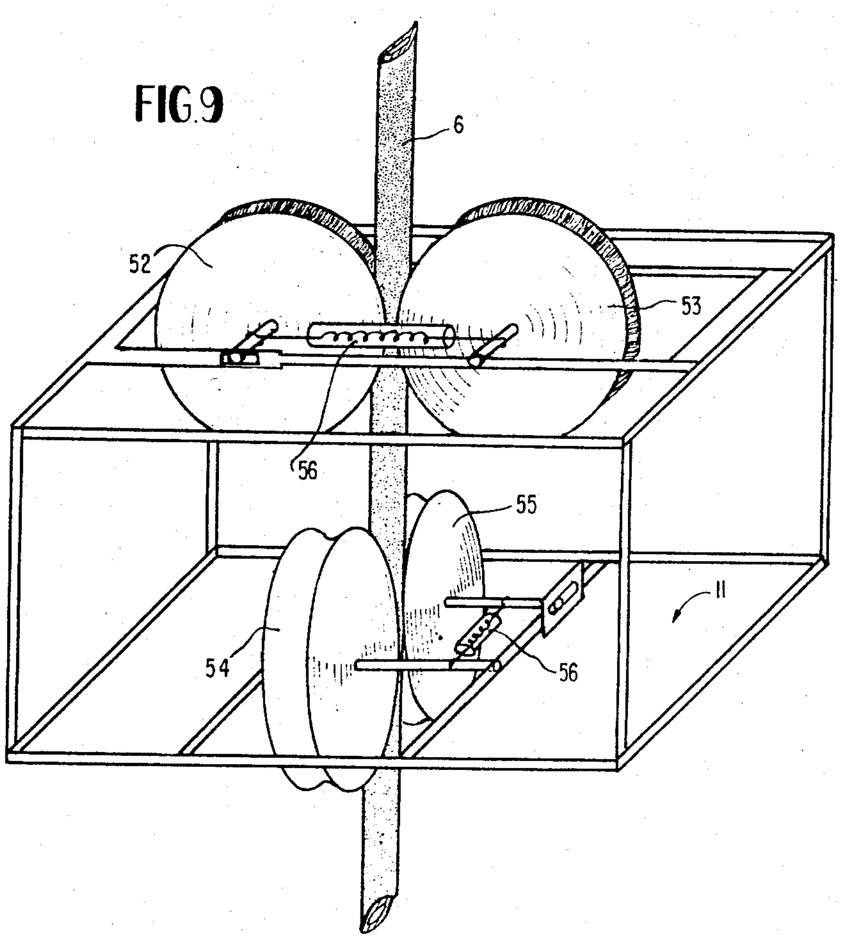
FIGURES 9 and 9A are perspective and plan views respectively of a device whereby the torque reaction generated by the running of the bottom motor is neutralized.
Figure 9A:
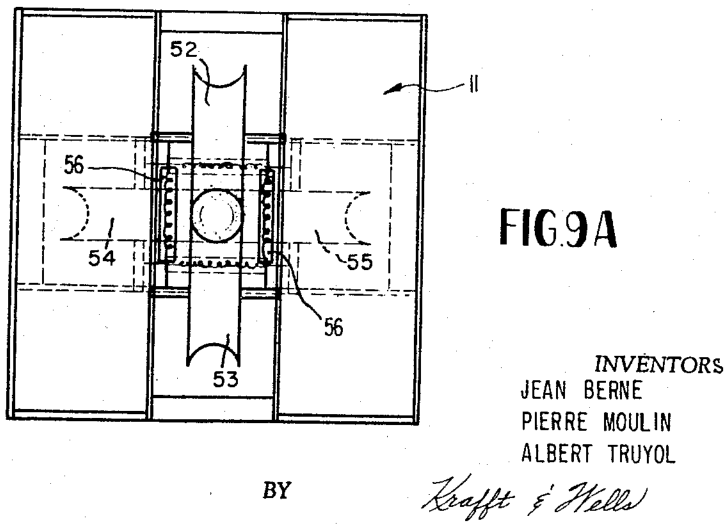

FIGURES 9 and 9A illustrate a device which may be used to neutralize the reaction torque on the flexible tube resulting from the running of the bottom motor.

This device may be advantageously secured to the upper part of the base structure (tripod) and will be used simultaneously as a guide for the flexible tube.

The device shown in FIGURES 9 and 9A comprises essentially two pairs of pulleys having grooves, the profile of which is so designed as to provide for the best possible rolling friction with the tube, said two pairs of pulleys being advantageously placed one below the other and preferably each one along a direction perpendicular to that of the other pair.

The two pulleys of each pair (52–53 or 54–55) are pressed against the flexible tube 16 by means of two springs 56 interconnecting their axes on both sides of the pulleys (FIG. 9A).

Of course, it is possible to make use of $n$ pairs of pulleys, $n$ being higher than 2 and, in such a case, it is advantageous to place the pairs of adjacent pulleys along respective directions forming therebetween an angle of $\pi/n$, e.g. an angle of 60° when using three pairs of pulleys. However, for the sake of simplicity, only two pairs of pulleys will preferably be used, provided that the reaction torque to be neutralized is not too high.

Figure 10:
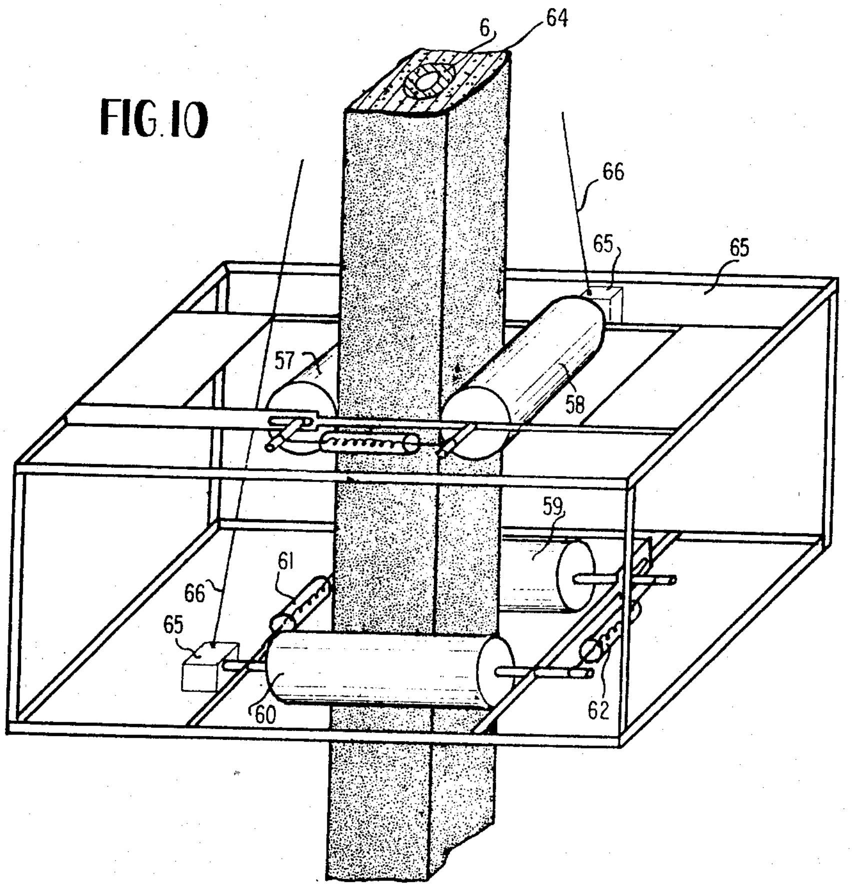
FIGURES 10 and 10A are perspective and plan views of a device comprising a flexible tube which simultaneously provides means for neutralizing the torque reaction to which the tube is subjected and means for recording at the surface the depth drilled.
Figure 10A:
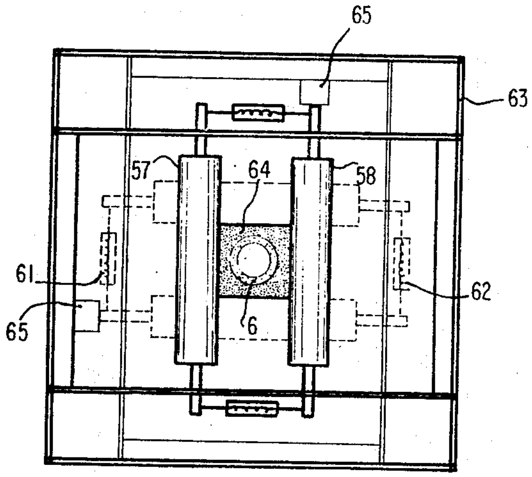

Another system for neutralizing the reaction torque is illustrated in FIGURES 10 and 10*a*. It requires the use of a flexible tube having a square or rectangular cross-section which may be manufactured by coating a flexible tube 6 of circular cross-section with a flexible material 64 having a square or rectangular cross-section, as shown in FIG. 10 and 10*a*.

This device consists of gripping the tube of square or rectangular section between two pairs of rollers placed at different levels.

The rollers of each pair (57–58 and 59–60) are interconnected through two springs such as 61 and 62 (FIG. 10) maintaining them pressed against the tube. The rollers revolve freely about their axis and are secured to a rigid frame 63 which may be for instance fixed to the upper part 11 of the base structure 12 (see FIG. 1).

The gripping force produced by the springs must be sufficient to prevent the rollers moving apart from each other by the effect of the reaction torque.

It is obviously possible to make use of a system of adjustable fixation of the roller axes on the frame 63 instead of springs.

By means of this device, the tube length passing between the rollers, which corresponds to the depth drilled, may be easily determined by counting, for instance, the number of revolutions of the rollers by the usual counting device 65 with electric transmission over a distance. Such devices are connected to the ship N by conductors 66 which can be attached to the cable 9.

Another system for determining with satisfactory accuracy the depth drilled would consist of placing, for instance, a pressure measuring device at the top S of the pump (FIG. 1). The variations of the hydrostatic pressure measured by this device and transmitted to the surface, for example through an appropriate conductor, are representative of the depth drilled which can be determined in this way with a satisfactory accuracy.

Figure 12:
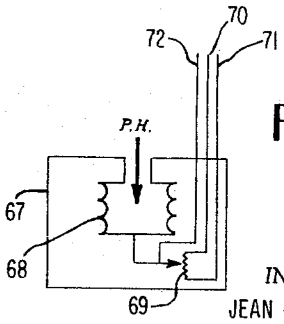
FIGURE 12 shows a water-tight box containing a recorder operated by the pressure-responsive elastic membrane.

FIGURE 12 shows one form of such a recorder having an elastic membrane 68 on which the hydrostatic pressure (P.H.) acts, said membrane contained in a water-tight box 67. The deformation of the membrane 68 is measured by a potentiometer 69 whose terminals 70 and 71 are connected to the terminals of a source of constant voltage. The difference of potential between the conductors 70 and 72 connected to the ship N makes it possible to follow instantaneously on the ship the value of the hydrostatic pressure at the top S of the submerged pump.

From the foregoing description, one skilled in the art can easily ascertain the essential characteristics of this invention and, without departing from the spirit and scope thereof, make various changes and modifications of the invention to adapt it to various usages and conditions. Consequently, such changes and modifications are properly, equitably and intended to be within the full range of equivalence of the following claims.

What is claimed as this invention is:

1. A submarine coring device adapted to be lowered to the sea bottom from a surface installation, said device comprising in combination a core cutter head, a bottom motor adapted to drive said core cutter head and having a central passage, a core barrel, extending above said core cutter head and operatively associated therewith, a water-tight pump located above said bottom motor, a flexible pipe connecting said water-tight pump to said central passage of said bottom motor, said pump feeding said cutter head with flushing fluid consisting of water under pressure, through said flexible pipe and said central passage of the bottom motor, an immersed element of positive buoyancy integral with said pump, maintaining said pump, said flexible pipe, said bottom motor and said core cutter head in substantially vertical alignment and cable means connected to said pump for lowering said coring device and feeding said pump with electric current from said surface installation.

2. A device, according to claim 1, wherein the core barrel is closed at its lower end by a piston acting as a stop plug and taking its bearing on a liquid contained in the core barrel, and comprises at its upper end a port, a valve closing said port, a calibration spring pressing said valve against said port so that the piston can penetrate into the core barrel only when the traversed formation is hard enough to result in a pressure, exerted by the core on the piston and the liquid, which pressure is higher than the calibration pressure of the spring.

3. A device, according to claim 1, wherein the core barrel is closed at its lower end by a piston and comprises ports for the passage of the flushing fluid beneath the level of the lower end of the piston, a tubular socket located within said core barrel and having ports registering with the corresponding ports of said core barrel as long as the piston is not displaced, said piston further comprising means for carrying along said tubular socket therewith, whereby the latter slides upwardly by such a height that its ports no longer register with those of the core barrel, and the inner wall of the core barrel is provided with means for locking said tubular socket at its upper position.

4. A device, according to claim 1, comprising a blade-carrying piston closing the core barrel at the lower end thereof, grooves located on said piston, pins secured to the inner wall of said core cutter for engagement into said grooves, said grooves being so designed that the cutter head drives the piston therewith in only one revolving direction, whereas in the other direction, the piston disengages from said pins and penetrates into the core barrel, the coring diameter being at most equal to the distance between the closer ends of the diametrically opposed pins.

5. A device according to claim 1, wherein said bottom motor is an electric motor and wherein electric conductors are incorporated with said cable means for feeding said motor with current from said surface installation.

6. A device according to claim 1, wherein conductors for the transmission of measuring values to the surface equipment are incorporated in said cable means.

7. A device according to claim 1, comprising a blade carrying piston closing the core barrel at the lower end thereof, pins integral with said piston, grooves located in the inner wall of said core cutter head, said grooves being adapted for engagement of said pins thereinto and having end walls, whereby the driving of said piston by the cutter head is limited to only one revolving direction, whereas in the other direction said piston is disengaged from said grooves and pentrates into the core barrel.

8. A device according to claim 1, provided with a base structure laid on the sea bed and comprising at least one guide for the flexible tube, said base structure maintaining in position said core cutter head, said core barrel and said bottom motor.

9. A device, according to claim 5, in which said electric motor comprises a tubular central stator having the core barrel so housed therein as to leave a free annular space between the same and the inner tube formed within said stator, for passage of the flushing fluid.

10. A device, according to claim 5, wherein said electric motor comprises a tubular central stator and a rotor having a rotor-prolonging member driving said core cutter head and in prolongation of said central stator, the core barrel, the upper portion of which, above that portion where the core is to be housed, comprises ports for the passage of the flushing fluid from said stator to the annular space forced between the core barrel and said rotor-prolonging member.

11. A device, according to claim 7, wherein, during the coring operation, the pins abut against the end walls of the corresponding grooves as a result of the revolution of the tool, and comprising a device for locking the pins in said position.

12. A device according to claim 11, comprising the association of a spring and a ball bearing on said spring for locking each of said pins against said end wall of the corresponding groove.

13. A device, according to claim 8, wherein the guide for the flexible tube consists of at least two pairs of pulleys, each having the tube pressed between the grooves thereof, and placed at different levels in the same vertical plane.

14. A device, according to claim 8, wherein the guide for the flexible tube consists of at least two pairs of pulleys, each having the tube pressed between the grooves thereof, and placed at different levels in respective vertical planes forming therebetween an angle of $180°/n$, $n$ being the number of pairs of pulleys.

15. A device, according to claim 8, wherein the flexible tube has a rectangular cross section and wherein the guide consists of two pairs of cylindrical rollers pressing the tube therebetween and placed at different levels, the rollers of one pair having a direction perpendicular to that of the rollers of the other pair.

16. A device, according to claim 8, wherein the flexible tube has a square cross section and wherein the guide consists of two pairs of cylindrical rollers pressing the tube therebetween and placed at different levels, the rollers of one pair having a direction perpendicular to that of the rollers of the other pair.

References Cited by the Examiner

UNITED STATES PATENTS

| | | | |
|---|---|---|---|
| 1,542,172 | 6/1925 | Reed et al. | 175—245 |
| 2,364,088 | 12/1944 | Miller et al. | 175—245 X |
| 2,650,068 | 8/1953 | Rand | 175—6 |
| 2,665,885 | 12/1954 | Fignoux | 175—6 |
| 3,078,931 | 2/1963 | Moore | 175—5 |

CHARLES E. O'CONNELL, *Primary Examiner.*

R. E. FAVREAU, *Assistant Examiner.*